(12) United States Patent
Jarok (10) Patent No.: US 10,015,481 B2
(45) Date of Patent: Jul. 3, 2018

(54) MULTI-AXIS CENTER OF MASS BALANCING SYSTEM FOR AN OPTICAL GIMBAL ASSEMBLY GUIDED BY INERTIAL MEASUREMENT

(71) Applicant: Goodrich Corporation, Charlotte, NC (US)

(72) Inventor: Jonathan C. Jarok, Chelmsford, MA (US)

(73) Assignee: Goodrich Corporation, Charlotte, NC (US)

(*) Notice: Subject to any disclaimer, the term of this patent is extended or adjusted under 35 U.S.C. 154(b) by 447 days.

(21) Appl. No.: 14/704,430

(22) Filed: May 5, 2015

(65) Prior Publication Data

US 2016/0330436 A1 Nov. 10, 2016

(51) Int. Cl.
| | |
|---|---|
| *H04N 7/18* | (2006.01) |
| *H04N 9/47* | (2006.01) |
| *H04N 17/00* | (2006.01) |
| *H04N 5/225* | (2006.01) |
| *G01C 21/18* | (2006.01) |
| *G01C 25/00* | (2006.01) |
| *G01M 1/12* | (2006.01) |
| *G02B 27/64* | (2006.01) |

(52) U.S. Cl.
CPC .......... *H04N 17/002* (2013.01); *G01C 21/18* (2013.01); *G01C 25/00* (2013.01); *G01M 1/12* (2013.01); *G02B 27/644* (2013.01); *H04N 5/2254* (2013.01)

(58) Field of Classification Search
None
See application file for complete search history.

(56) References Cited

U.S. PATENT DOCUMENTS

| | | | |
|---|---|---|---|
| 2,714,311 | A | 8/1955 | Dobson, III et al. |
| 3,010,326 | A | 11/1961 | Koning |
| 3,576,133 | A | 4/1971 | Krupick et al. |
| 3,638,502 | A | 2/1972 | Leavitt et al. |

(Continued)

FOREIGN PATENT DOCUMENTS

| | | |
|---|---|---|
| JP | 2007271392 A | 10/2007 |
| WO | WO-2014201447 A2 | 12/2014 |
| WO | WO-2015022433 A1 | 2/2015 |

OTHER PUBLICATIONS

European Extended Search Report issued by Examiner Maarten Bruinsma, of the European Patent Office, dated Oct. 17, 2016, in corresponding European Patent Application No. 16168469.

*Primary Examiner* — Talha M Nawaz
(74) *Attorney, Agent, or Firm* — Locke Lord LLP; Scott D. Wofsy; Joshua L. Jones (57) ABSTRACT

A multi-axis balancing system is disclosed for calibrating an optical gimbal, which includes a gimbal platform defining a pitch axis and a roll axis, an inertial measurement unit located on the optical gimbal for calculating a center of mass of the optical gimbal, a weight adjustable mass moveable relative to the pitch axis and the roll axis of the gimbal platform to locate a balance point for the optical gimbal in response to active feedback from the inertial measurement unit relating to the calculated center of mass of the optical gimbal, and a multi-axis drive assembly for effectuating linear movement of the mass relative to the pitch and roll axes of the gimbal platform.

17 Claims, 7 Drawing Sheets

(56) References Cited

U.S. PATENT DOCUMENTS

| | | | |
|---|---|---|---|
| 4,520,973 | A | 6/1985 | Clark et al. |
| 4,971,445 | A * | 11/1990 | Sato .................. G01B 9/04 |
| | | | 250/559.22 |
| 5,184,521 | A * | 2/1993 | Tyler .................. G01C 21/18 |
| | | | 248/324 |
| 5,443,247 | A | 8/1995 | Polites et al. |
| 5,794,081 | A | 8/1998 | Itoh et al. |
| 7,625,090 | B2 | 12/2009 | Brown et al. |
| 7,658,555 | B1 * | 2/2010 | Moilanen ............ G01C 21/18 |
| | | | 348/373 |
| 8,161,832 | B2 | 4/2012 | Naumov et al. |
| 8,564,499 | B2 | 10/2013 | Bateman et al. |
| 8,614,742 | B2 | 12/2013 | Stowe et al. |
| 2002/0194939 | A1 | 12/2002 | Cox |
| 2004/0074720 | A1 | 4/2004 | Thieltges |
| 2007/0050139 | A1 | 3/2007 | Sidman |
| 2007/0086295 | A1 * | 4/2007 | McGlennen ......... G11B 7/0953 |
| | | | 369/53.14 |
| 2010/0070132 | A1 | 3/2010 | Doi |
| 2011/0025831 | A1 * | 2/2011 | Bewersdorf ......... G02B 21/16 |
| | | | 348/50 |
| 2012/0035786 | A1 | 2/2012 | Yamauchi et al. |
| 2012/0182849 | A1 * | 7/2012 | Granger-Brown ..... G01B 7/312 |
| | | | 369/53.41 |
| 2013/0125667 | A1 * | 5/2013 | Fitz-Coy ............ B64G 1/286 |
| | | | 73/862.041 |
| 2014/0270744 | A1 * | 9/2014 | Webb .................. H04N 5/2328 |
| | | | 396/55 |

\* cited by examiner

MULTI-AXIS CENTER OF MASS BALANCING SYSTEM FOR AN OPTICAL GIMBAL ASSEMBLY GUIDED BY INERTIAL MEASUREMENT

BACKGROUND OF THE INVENTION

1. Field of the Invention

The subject invention is directed to a balancing system for a gimbal assembly, and more particularly, to a center of mass balancing system for an optical gimbal assembly which is guided by active feedback derived from an inertial measurement unit associated with the gimbal.

2. Description of Related Art

Gimbals are often used for mounting optical instrumentation and sensors used in airborne surveillance applications including, for example, airborne law enforcement, pipe and power line inspection, mapping, and intelligence, surveillance and reconnaissance missions. The optical instrumentation can include sensors for thermal imaging, as well as laser range finders and illuminators.

It is important for the gimbal to be perfectly balanced about its rotation axes in order to prevent drift, which may affect the accuracy of the system. This is particularly important when the gimbal is used for imaging or targeting on an airborne platform, where such an error can have a cumulative effect.

It is extremely difficult to machine gimbal components to obtain perfect balance due to limitations of the machine tools used in the manufacture of the components. Accordingly, gimbal balancing devices are often provided to remedy this inherent defect. In general, these balancing devices attempt to position a mass relative to the gimbal axes, which is adapted to rotate with the gimbal in order to shift the gimbal center of gravity.

Presently available gimbals equipped with these balancing devices have had limited success, since they typically require direct access to the balancing device and to the gimbal. Under these conditions, once a gimbal has been properly balanced and enclosed in a protective housing, direct access to correct any subsequent imbalance in the system can be difficult.

SUMMARY OF THE INVENTION

The subject invention is directed to a multi-axis balancing system for calibrating an optical gimbal assembly, such as, for example, an optical gimbal used on an aircraft for imaging and/or targeting.

The multi-axis balancing system includes a gimbal platform defining a pitch axis and a roll axis. The gimbal platform is adapted and configured to be mounted to the gimbal of the optical gimbal assembly. The system further includes an inertial measurement unit operatively associated with or otherwise located on the gimbal to calculate the center of mass of the gimbal.

An adjustable mass is operatively associated with the gimbal platform and is mounted for linear movement relative to the pitch axis and the roll axis of the gimbal platform to locate a balance point for the gimbal in response to feedback from the inertial measurement unit relating to a calculated center of mass of the gimbal.

A multi-axis drive assembly is provided for effectuating the linear movement of the mass relative to the pitch axis and the roll axis of the gimbal platform. The multi-axis drive assembly preferably includes a first linear actuator for moving the mass along the roll axis of the gimbal platform relative to the pitch axis of the gimbal platform, and a second linear actuator for moving the mass along the pitch axis of the gimbal platform relative to the roll axis of the gimbal platform.

In a preferred embodiment of the invention, the first and second linear actuators convert the rotary motion of a motor to linear motion through a screw driven mechanism. Alternatively, the linear actuators motion could be effectuated by a belt driven mechanism. In any event, a motor controller operatively associated with the gimbal platform for controlling the motors associated with the first and second linear actuators.

The first linear actuator moves a stage supporting the mass, and the second linear actuator moves the entire first linear actuator. The first linear actuator is supported on an elongated bracket and the elongated bracket is connected to a driven member that is operatively associated with the second linear actuator.

The first linear actuator includes a motor, a drive screw connected to the motor and a bearing supporting the drive screw, wherein the motor and bearing of the first linear actuator are mounted to the elongated bracket. The stage that supports the mass is operatively associated with the drive screw of the first linear actuator.

The second linear actuator includes a motor, a drive screw connected to the motor and a bearing supporting the drive screw, wherein the motor and bearing of the second linear actuator are mounted to the gimbal platform. The driven member of the second linear actuator is driven by the drive screw of the second linear actuator.

The subject invention is also directed to a multi-axis balancing system for calibrating an optical gimbal that includes a gimbal platform defining a pitch axis and a roll axis, an inertial measurement unit located on the gimbal adjacent an intersection of the pitch axis and the roll axis for calculating a center of mass of the gimbal, a weight adjustable mass moveable relative to the pitch axis and the roll axis of the gimbal platform to locate a balance point for the gimbal in response to active feedback from the inertial measurement unit relating to the calculated center of mass of the gimbal, and a multi-axis drive assembly for effectuating linear movement of the mass.

These and other features of the multi-axis balancing system of the subject invention and the manner in which it is manufactured and employed will become more readily apparent to those having ordinary skill in the art from the following enabling description of the preferred embodiments of the subject invention taken in conjunction with the several drawings described below.

BRIEF DESCRIPTION OF THE DRAWINGS

So that those skilled in the art to which the multi-axis balancing system of the subject invention appertains will readily understand how to make and use the subject invention without undue experimentation, preferred embodiments thereof will be described in detail herein below with reference to certain figures, wherein.

DETAILED DESCRIPTION OF PREFERRED EMBODIMENTS

Figure 1:
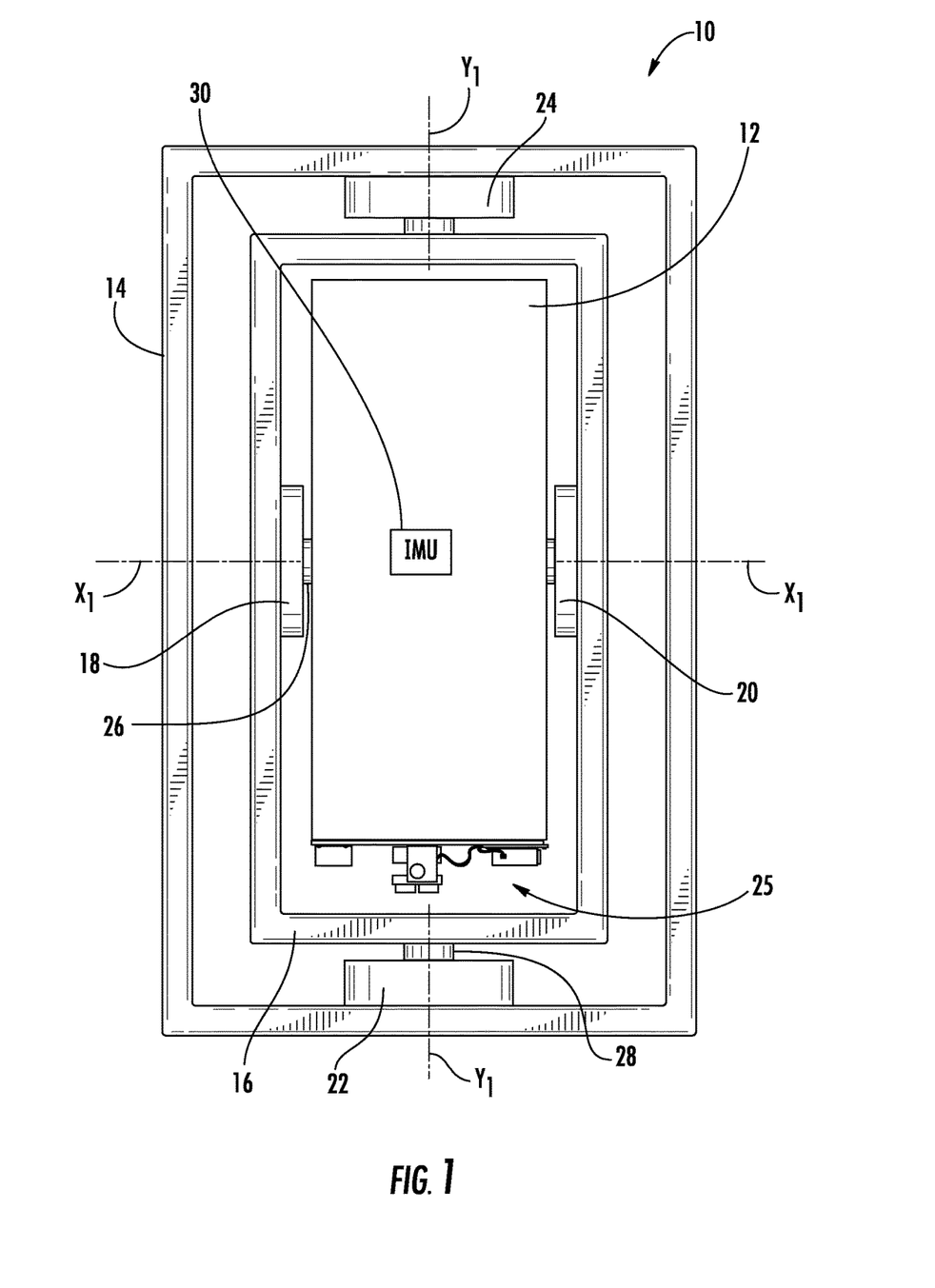
FIG. 1 is a top plan view of a gimbal assembly that includes an optical gimbal assembly equipped with the multi-axis balancing system and associated Inertial Measurement Unit (IMU) of the subject invention.

Referring now to the drawings, wherein like reference numerals identify similar structural features or aspects of the subject invention, there is illustrated in FIG. 1 a gimbal assembly 10 that includes a gimbal 12 equipped with the multi-axis balancing assembly of the subject invention, which is designated generally by reference numeral 25. In accordance with a preferred embodiment of the subject invention, the gimbal 12 is an optical gimbal used on an aircraft for imaging and/or targeting.

Referring now to FIG. 1, in addition to the gimbal 12, the assembly 10 includes an outer frame 14 and an inner frame 16. The inner frame 16 is supported for axial rotation about a roll axis $X_1$ of the assembly 10 within the outer frame 14 by a roll motor 18 and an opposed roll bearing 20. The gimbal 12 is supported for axial rotation about a pitch axis $Y_1$ of the assembly 10 within the inner frame 16 by a pitch motor 22 and an opposed pitch bearing 24. A roll resolver 26 is operatively associated with the roll motor 18 for measuring angular rotation about the roll axis $X_1$ of the gimbal 12. A pitch resolver 28 is operatively associated with the pitch motor 22 for measuring angular rotation about the pitch axis $Y_1$ of the gimbal 12.

With continuing reference to FIG. 1, an inertial measurement unit (IMU) 30 is mounted to the gimbal 12 to report on the orientation of the gimbal. The inertial measurement unit 30 is preferably located at an intersection of the pitch and roll axes of the gimbal 12. Inertial measurement unit 30 operates by detecting the rate of acceleration of the gimbal using one or more accelerometers, and changes in rotational attributes such as pitch, roll and yaw using one or more gyroscopes. In the subject invention, the inertial measurement unit 30 functions to determine the appropriate side of the gimbal on which to position the multi-axis balancing assembly 25 and to provide date for calculating the center of mass of the gimbal 12, which is then used by the multi-axis drive balancing assembly 25 to balance the gimbal 12, as will be discussed in greater detail hereinbelow.

Figure 2:
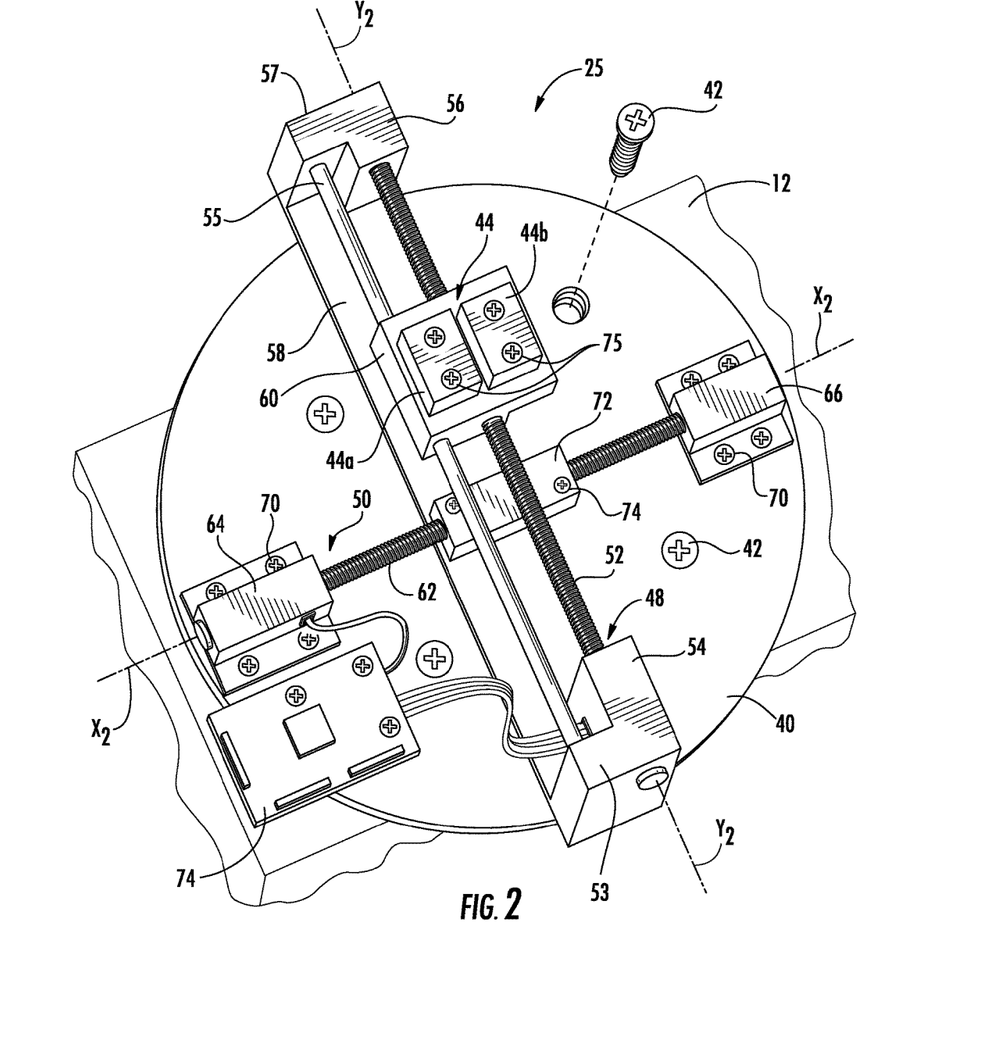
FIG. 2 is a perspective view of the multi-axis balancing system of the subject invention mounted on the negative side of the pitch axis $X_1$ of the gimbal assembly shown in FIG. 1.

Referring now to FIG. 2, the multi-axis balancing assembly 25 includes a generally circular, planar gimbal platform 40 defining a pitch axis designated as $X_2$ and a roll axis designated as $Y_2$. Those skilled in the art will readily appreciate that the size and shape of the gimbal platform 40 will be determined by the size and shape of the gimbal to which it is mounted.

The gimbal platform 40 is mounted to one side of the gimbal 12, as best seen in FIG. 1, using a plurality of threaded fasteners 42 or the like. The side of the gimbal 12 (positive or negative with respect to the pitch axis $X_2$) upon which the gimbal platform 40 is mounted is determined using the IMU 30, in an initial balancing process which is described in detail hereinbelow.

The multi-axis balancing system 25 further includes an adjustable mass assembly 44, which includes weights 44a and 44b. In general, the mass assembly 44 is mounted for linear movement relative to the pitch axis $X_2$ and the roll axis $Y_2$ of the gimbal platform 40, to locate a balance point for the gimbal 12 in response to feedback received from the inertial measurement unit 30 relating to a calculated center of mass of the gimbal 12. The process for determining the center of mass of the gimbal 12 is described in detail hereinbelow.

The multi-axis drive assembly 25 further includes a first linear actuation mechanism 48 for moving the adjustable mass assembly 44 in a linear direction along the roll axis $Y_2$ of the gimbal platform 40 relative to the pitch axis $X_2$ of the gimbal platform 40, and a second linear actuation mechanism 50 for moving the adjustable mass assembly 44 in a linear direction along the pitch axis $X_2$ of the gimbal platform 40 relative to the roll axis $Y_2$ of the gimbal platform 40.

Figure 3:
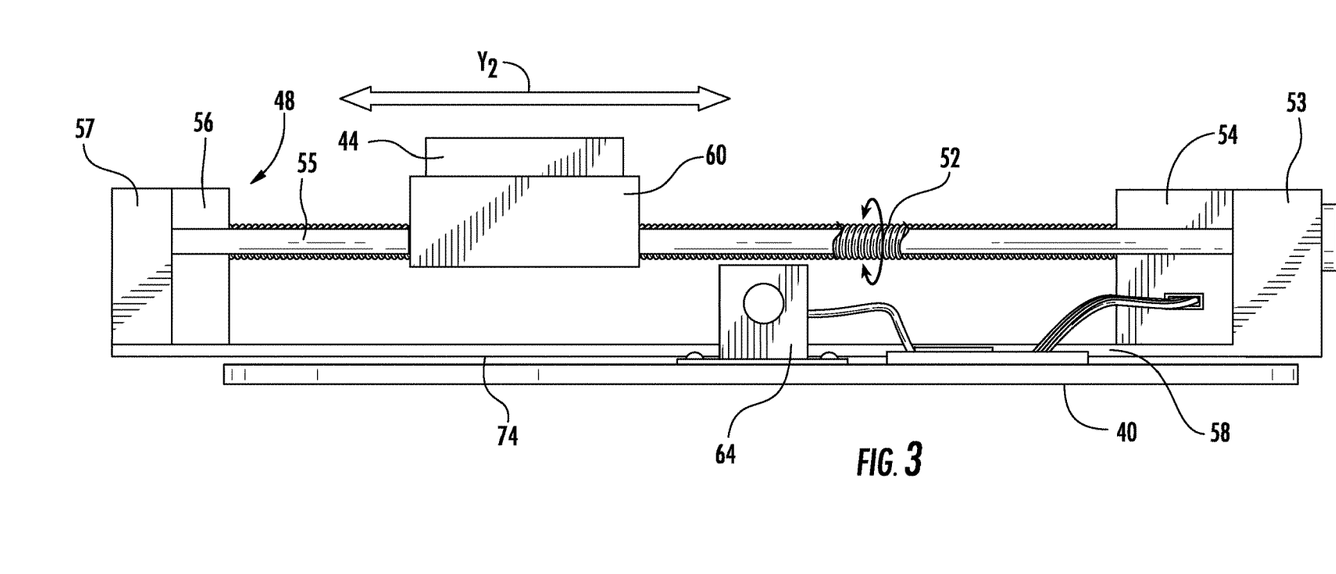
FIG. 3 is a side elevation view of the multi-axis balancing system of FIG. 2, illustrating the components of the linear actuation mechanism that functions to move the adjustable mass of the balancing system along the roll axis $Y_2$ of the gimbal platform.

The first linear actuation mechanism 48 includes an elongated drive screw 52 connected to a drive motor 54 and a support bearing 56. The drive motor 54 and support bearing 56 are mounted to or otherwise connected to one another by an elongated rectangular bracket 58, as best seen in FIG. 3. This forms an integral assembly that can move in tandem.

The weights 44a and 44b of the adjustable mass assembly 44 are secured or otherwise fastened by screws 45 to a stage 60. The weights 44a and 44b are preferably selected from a set of weights that can be provided with the balancing assembly 25. The stage 60 is threadably connected to or otherwise operatively associated with the drive screw 52.

A slide rod 55 extends between a first end cap 53 adjacent motor 54 and a second end cap 57 adjacent bearing 56. The slide rod 55 extends through stage 60 to maintain the angular orientation of the stage 60 relative to drive screw 52, when drive screw 52 is rotating. Consequently, rotation of the drive screw 52 in a clock-wise or counter-clockwise direction (negative or positive angular rotation) causes corresponding forward and rearward linear movement of the stage 60 along the axis of the drive screw 52, together with the mass assembly 44.

Linear drive screw mechanisms designed to produce linear motion by rotating a drive screw are well known in the art and include acme screw type actuators, ball screw type actuators and roller or planetary screw type actuators. Suitable commercially available linear actuators are manufactured and sold by NSK Corporation of Ann Arbor, Mich.

Figure 4:
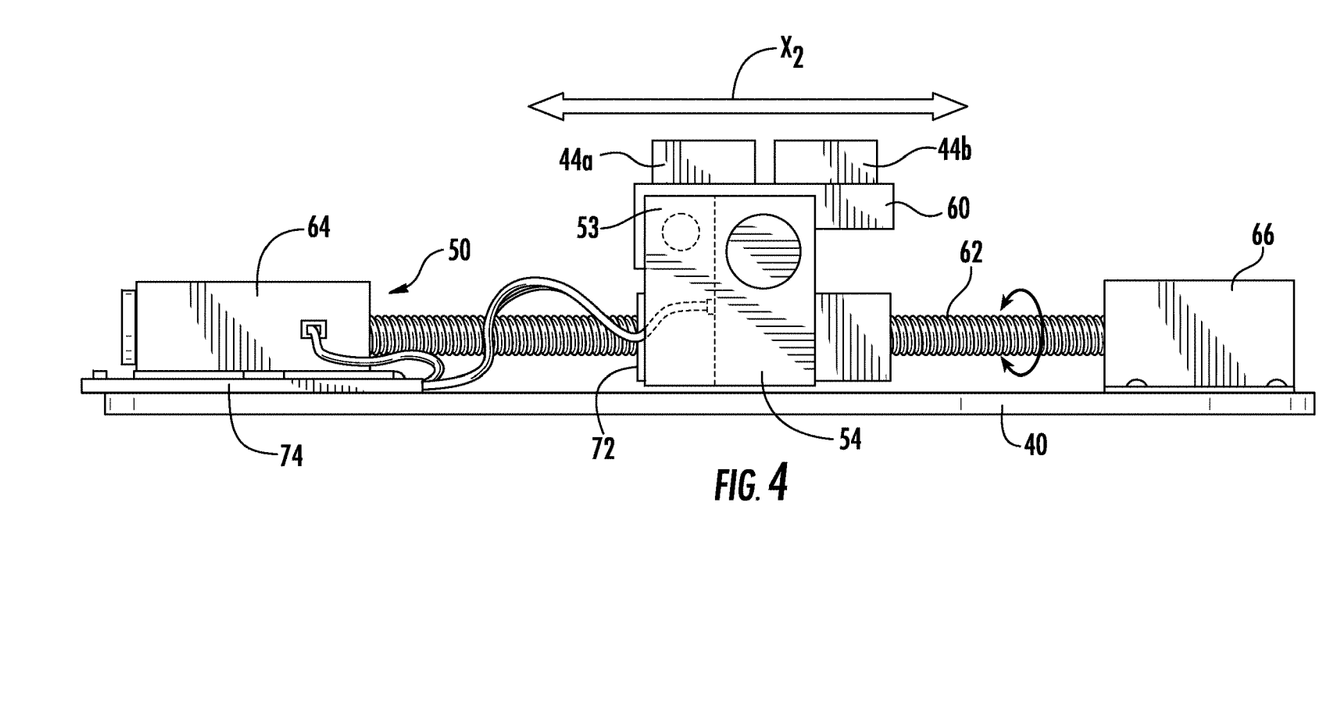
FIG. 4 is a side elevation view of the multi-axis balancing system of FIG. 2, illustrating the components of the linear actuation mechanism that functions to move the adjustable mass along the pitch axis $X_2$ of the gimbal platform.
Figure 5:
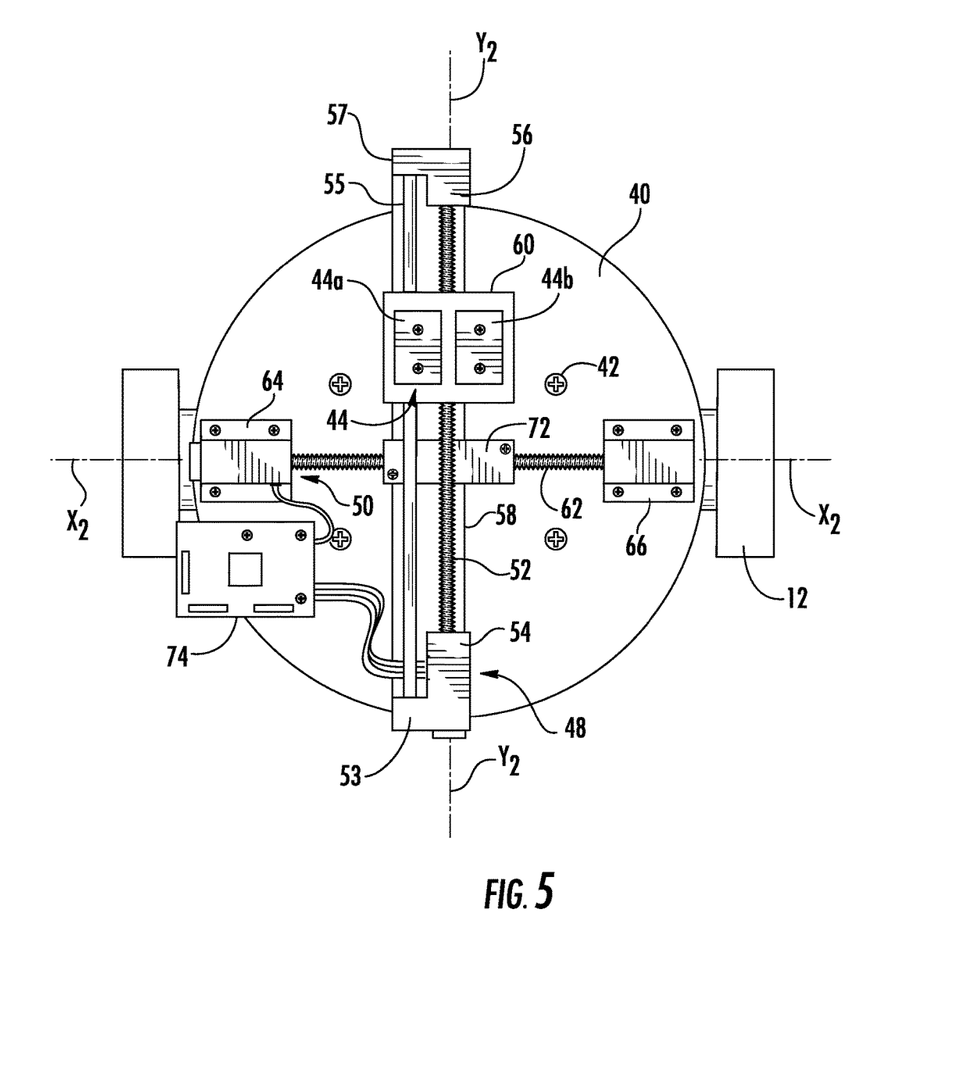
FIG. 5 is a top plan view of the multi-axis balancing system of the subject invention wherein the adjustable mass of the balancing system is axially aligned with the roll axis $Y_2$ of the gimbal platform and offset from the pitch axis $X_2$ of the gimbal platform in a positive direction.

The second linear actuation mechanism 50 also includes an elongated drive screw 62 connected to drive motor 64 and a support bearing 66. The drive motor 64 and support 66 are mounted directly to the gimbal platform 40 by a plurality of threaded fasteners 70, as best seen in FIG. 4. A mounting block 72 is threadably connected to or otherwise operatively associated with the drive screw 62. Consequently, rotation of the drive screw 62 in a clock-wise or counter-clockwise direction causes corresponding forward and rearward linear movement of the mounting block 72 along the drive screw 62. Furthermore, the mounting block 72 is physically connected to the elongated bracket 58 by threaded fasteners 75 such that the entire first linear actuation mechanism 48 travels together with mounting block 72, as illustrated in FIGS. 5 and 6 during the multi-axis balancing process described below.

Figure 6:
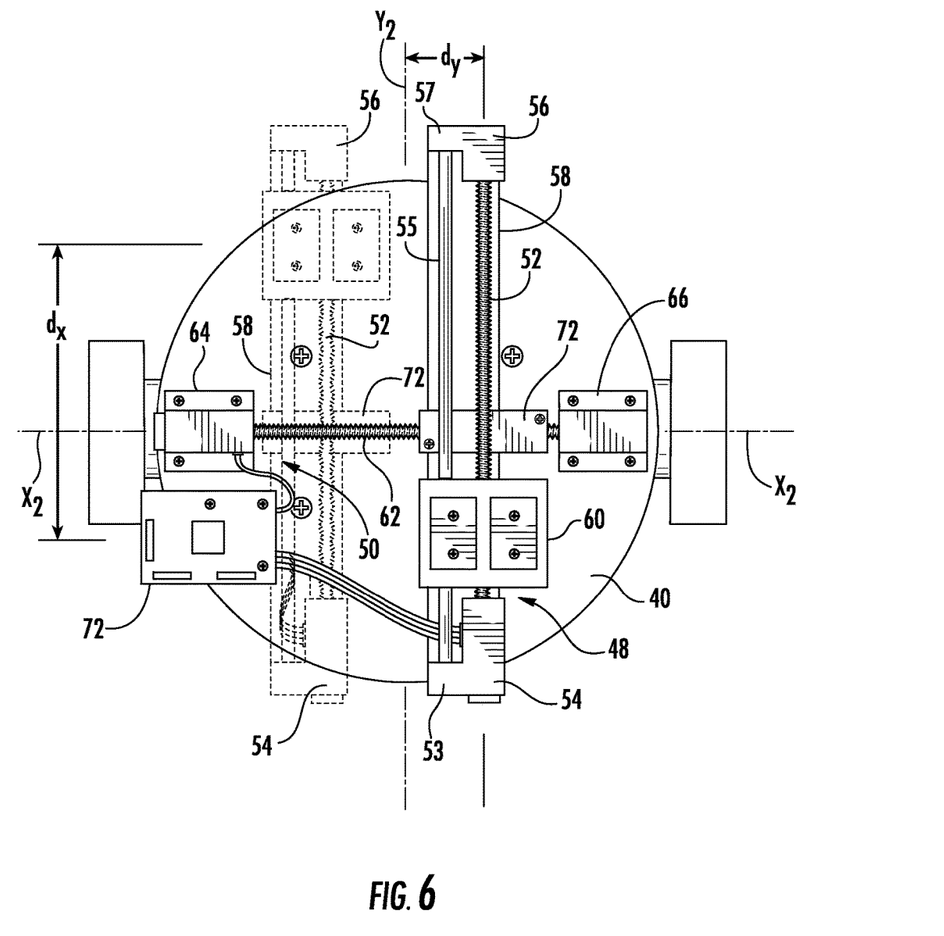
FIG. 6 is a top plan view of the multi-axis balancing system of the subject invention wherein the adjustable mass of the balancing system is shown having moved from a first location on the negative side of the roll axis $Y_2$ and the positive side of the pitch axis $X_2$ to a second location on the positive side of the roll axis $Y_2$ and the negative side of the pitch axis $X_2$.

More particularly, FIG. 6 illustrates the linear movement of the stage 60 carrying mass 44 from an initial location on the positive side of the pitch axis $X_2$ (shown in phantom lines) to a subsequent location on the negative side of the pitch axis $X_2$, having moved a distance $d_x$. In addition, FIG. 6 illustrates the linear movement of the entire first linear actuation mechanism 48 from an initial location on the negative side of the roll axis $Y_2$ (shown in phantom lines) to a subsequent location on the positive side of the roll axis $Y_2$, having moved a linear distance $d_y$.

The multi-axis drive assembly 25 further includes a motor controller 74 that is operatively associated with or otherwise mounted on the gimbal platform 40. The motor controller 74 controls the drive motors 54 and 56 associated with the first and second linear actuators 48 and 50. More particularly, the motor controller 74 is adapted to receive commands from an operator in order to step the motor drive motors in either a positive or negative rotational direction during the balancing gimbal process described below. The motor controller 74 can be configured to receive local commands or remote commands.

Turning now to the method of using the multi-axis balancing assembly 25 of the subject invention, there are processes that are performed to balance the gimbal 12 of assembly 10. The first process is a gross balancing process to determine where the balancing assembly should be positioned on the gimbal 12. The second process is a fine balancing process to determine the center of gravity of the gimbal 12.

The first process utilizes the 3-axis accelerometer of the IMU 30. Initially, the assembly 10 is placed on a flat surface, and the pitch motor 18 and roll motor 22 are set to a zero location, whereby the pitch and roll axes $X_1$ and $Y_1$ of the gimbal 12 are parallel to earth. The pitch and roll motors 18 and 22 are then turned off. Thereupon, the operator observes whether the gimbal 12 moves. If the gimbal 12 does not move, the system is in balance.

If the gimbal 12 moves, the operator obtains vector data from the 3-axis accelerometer of the Inertial Measurement Unit (IMU) 30, and determines the extent of deviation relative to the z-axis. This value identifies the side of the pitch axis $X_1$ of the gimbal 12 that the center of mass balancing assembly 25 should be mounted on the gimbal 12. For example, in FIG. 1, the assembly 25 is placed on the negative side of the gimbal pitch axis $X_1$. This measurement also indicates which direction the mass 44 should be biased on the roll axis $Y_1$ of the gimbal 12.

Figure 7:
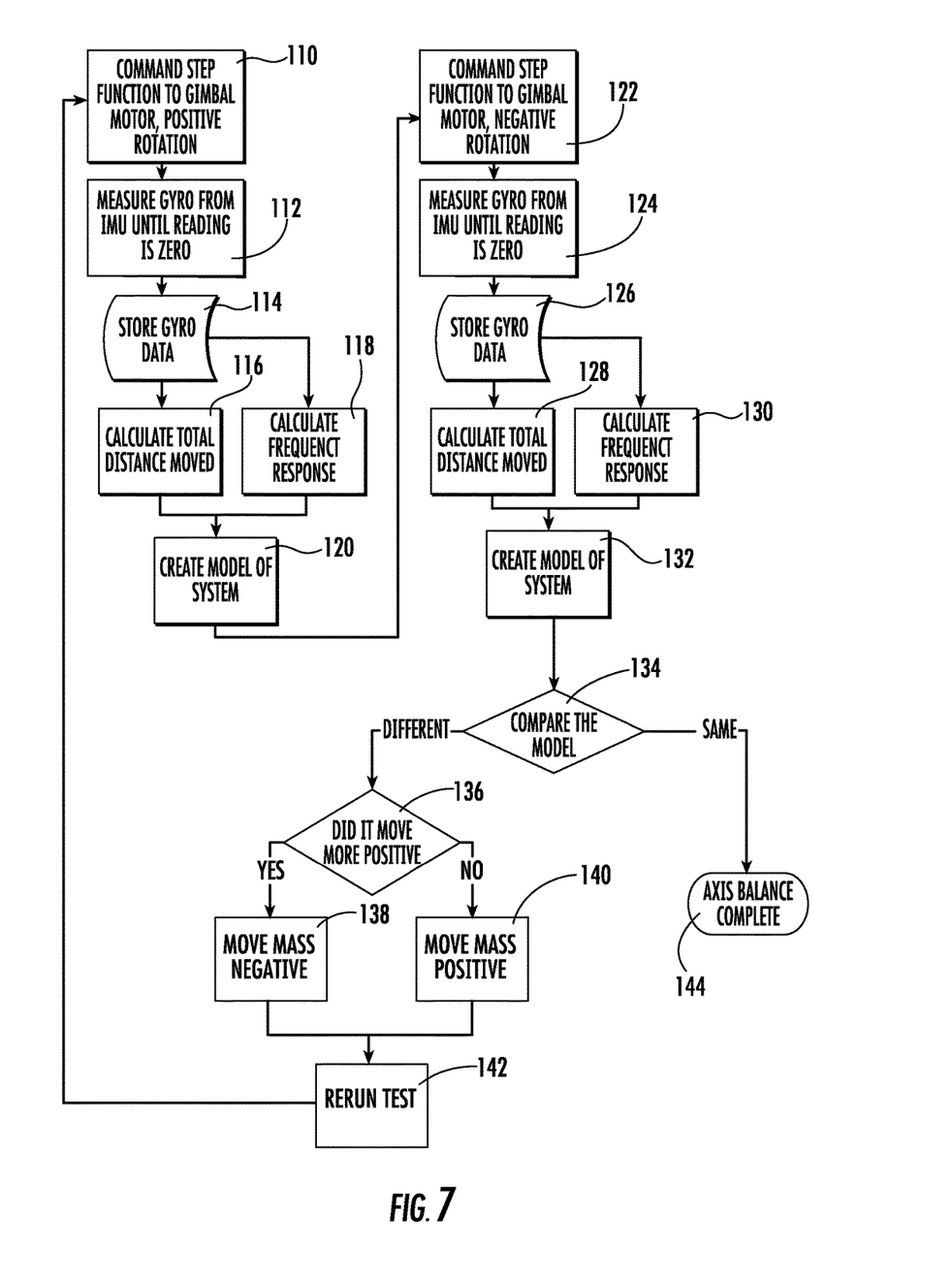
FIG. 7 is a process flow chart illustrating the method for balancing a gimbal along an axis of interest utilizing the multi-axis balancing system of the subject invention.

The second part of the balancing process of the subject invention is the fine balancing process, which is illustrated in FIG. 7 and is generally designated by reference numeral 100. The fine balancing process 100 involves the IMU 30, pitch resolver 26 and the roll resolver 28, as well as the pitch and roll motors 18 and 22. The process 100 involves commanding the pitch and roll motors 18 and 22 to perform an impulse in each axis of the gimbal 12 (i.e., the pitch axis $X_1$ and the roll axis $Y_1$), both in the positive rotational direction and in the negative rotational direction to find the center of mass of the gimbal, and thereby balance the gimbal thereabout.

By way of example, the roll motor 18 is commanded by an operator through roll resolver 26 with a step function in a positive direction at step 110. The gyro response to the commanded impulse is measured from the IMU 30 at step 112, yielding an angular rate in radians per second. This is done until the gyro reading is zero. That data is then stored at step 114. The total distance the gimbal 12 moves about the roll axis $Y_1$ is then calculated at step 116 along with the frequency response at step 118, and a positive direction system model is created at step 120 for the roll axis.

This routine is then repeated in the negative direction on that same axis of interest beginning at step 122. That is, the gyro response is measured at step 124 until there is a zero reading, that data is stored at step 126, the distance moved in the negative direction and frequency response are calculated at steps 128 and 139, and a system model for the negative direction is created. The positive direction model created at step 120 is then compared to the negative direction model created at step 132 for the roll axis $Y_1$ at step 134.

If the two models are different, a determination is made at step 136 as to whether the movement about the roll axis was more positive or more negative. If the answer to that inquiry is yes, then the mass 44 of the balancing assembly 25 is moved in a negative direction at step 138 relative along the roll axis $Y_2$ of the balancing assembly 25. If the answer to the inquiry is no, then the mass 44 of the balancing assembly 25 is moved in a positive direction at step 140 along the roll axis $Y_2$ of the balancing assembly 25. The test is then rerun at step 142 to confirm that the gimbal 12 has been balanced with respect to the axis of interest. If the models compared at step 134 are the same, the axis of interest is balanced and the process is deemed complete for that axis at step 144. Thereupon, the fine balancing process 100 may be repeated for the other axis.

It is also contemplated and well within the scope of the subject disclosure to provide a method of determining the mass of the system by calculating the frequency response of the system using the gyroscope data from the IMU 30. The frequency response can help to identify the mass of the system and the spring constant. Using multiple measurements and linear algebra all of the constants and variables can be determined and used by the multi-axis balancing assembly 25 to locate a balance point for the gimbal 12.

While the subject invention has been shown and described with reference to preferred embodiments, those skilled in the art will readily appreciate that various changes and/or modifications may be made thereto without departing from the spirit and scope of the subject invention as defined by the appended claims. For example, it is envisioned that the linear actuators of the two drive assemblies could be belt driven mechanisms rather than screw driven mechanisms as shown.

What is claimed is:

1. A multi-axis balancing system for calibrating an optical gimbal, comprising:
    a gimbal platform defining a pitch axis and a roll axis;
    a mass mounted for linear movement relative to the pitch axis and the roll axis of the gimbal platform to locate a balance point for the optical gimbal in response to feedback from an inertial measurement unit operatively associated with the optical gimbal relating to a calculated center of mass of the optical gimbal; and
    a multi-axis drive assembly for effectuating the linear movement of the mass relative to the pitch axis and the roll axis of the gimbal platform, wherein the multi-axis drive assembly includes a first linear actuator for moving the mass relative to the roll axis of the gimbal platform and a second linear actuator for moving the mass relative to the pitch axis of the gimbal platform.

2. A multi-axis balancing system as recited in claim 1, further comprising an inertial measurement unit located on the optical gimbal to calculate the center of mass of the optical gimbal.

3. A multi-axis balancing system as recited in claim 1, wherein the first and second linear actuators convert the rotary motion of a motor to linear motion through a screw driven mechanism.

4. A multi-axis balancing system as recited in claim 1, wherein the first linear actuator moves a stage supporting the mass, and the second linear actuator moves the first linear actuator.

5. A multi-axis balancing system as recited in claim 4, wherein the first linear actuator is supported on an elongated bracket and the elongated bracket is connected to a driven member that is operatively associated with the second linear actuator.

6. A multi-axis balancing system as recited in claim 5, wherein the first linear actuator includes a motor, a drive screw connected to the motor and a bearing supporting the drive screw, wherein the motor and bearing are mounted to the elongated bracket.

7. A multi-axis balancing system as recited in claim 6, wherein the stage is operatively associated with the drive screw of the first linear actuator.

8. A multi-axis balancing system as recited in claim 5, wherein the second linear actuator includes a motor, a drive screw connected to the motor and a bearing supporting the drive screw, wherein the motor and bearing are mounted to the gimbal platform.

9. A multi-axis balancing system as recited in claim 8, wherein the driven member is driven by the drive screw of the second linear actuator.

10. A multi-axis balancing system as recited in claim 8, wherein the motor and bearing of the second linear actuator are connected to a mounting plate and the mounting plate is connected to the gimbal platform.

11. A multi-axis balancing system as recited in claim 3, further comprising a motor controller operatively associated with the gimbal platform for controlling the motors associated with the first and second linear actuators.

12. A multi-axis balancing system as recited in claim 1, wherein the weight of the mass is adjustable.

13. A multi-axis balancing system for calibrating an optical gimbal, comprising:
 a gimbal platform defining a pitch axis and a roll axis;
 an inertial measurement unit located on the optical gimbal for calculating a center of mass of the optical gimbal;
 a weight adjustable mass moveable relative to the pitch axis and the roll axis of the gimbal platform to locate a balance point for the optical gimbal in response to active feedback from the inertial measurement unit relating to the calculated center of mass of the optical gimbal; and
 a multi-axis drive assembly operatively associated with the gimbal platform for effectuating linear movement of the mass relative to the pitch and roll axes of the gimbal platform, wherein the multi-axis drive assembly includes a first linear actuator for moving the mass relative to the roll axis of the gimbal platform and a second linear actuator for moving the mass relative to the pitch axis of the gimbal platform.

14. A multi-axis balancing system as recited in claim 13, wherein the first linear actuator moves a stage supporting the mass, and the second linear actuator moves the first linear actuator.

15. A multi-axis balancing system as recited in claim 14, wherein the first linear actuator is supported on an elongated bracket and the elongated bracket is connected to a driven member that is operatively associated with the second linear actuator.

16. A multi-axis balancing system as recited in claim 15, wherein the first linear actuator includes a motor, a drive screw connected to the motor and a bearing supporting the drive screw, wherein the motor and bearing of the first linear actuator are mounted to the elongated bracket, and the stage is operatively associated with the drive screw of the first linear actuator.

17. A multi-axis balancing system as recited in claim 16, wherein the second linear actuator includes a motor, a drive screw connected to the motor and a bearing supporting the drive screw, wherein the motor and bearing of the second linear actuator are mounted to the gimbal platform, and the driven member is driven by the drive screw of the second linear actuator.

* * * * *